(12) United States Patent
Forsman et al.

(10) Patent No.: US 7,501,571 B2
(45) Date of Patent: Mar. 10, 2009

(54) LIGHTING DISPLAY RESPONSIVE TO VIBRATION

(76) Inventors: Jon Forsman, 5105 80th St. SW., Mukilteo, WA (US) 98275-2623; Brian D. Brooks, 8720 28th Ave. SE., Everett, WA (US) 98208

( * ) Notice: Subject to any disclaimer, the term of this patent is extended or adjusted under 35 U.S.C. 154(b) by 654 days.

(21) Appl. No.: 11/153,744

(22) Filed: Jun. 14, 2005

(65) Prior Publication Data

US 2006/0291212 A1    Dec. 28, 2006

(51) Int. Cl.
G10H 1/02 (2006.01)
G10H 1/00 (2006.01)
A63H 17/00 (2006.01)
A63J 5/10 (2006.01)

(52) U.S. Cl. .......... 84/737; 84/464 R
(58) Field of Classification Search ........ 84/464 R, 84/464 A, 737
See application file for complete search history.

(56) References Cited

U.S. PATENT DOCUMENTS

| 3,636,515 A | 1/1972 | Smith ............ 340/148 |
| 3,869,699 A | 3/1975 | Haller et al. ........ 340/148 |
| 4,091,706 A | 5/1978 | Ludwig ............ 84/411 |
| 4,353,008 A | 10/1982 | Dorfman ........... 315/114 |
| 5,056,399 A | 10/1991 | Hornstein .......... 84/464 |
| 5,083,064 A | 1/1992 | Jones, Sr. .......... 315/294 |
| 5,402,702 A | 4/1995 | Hata ............. 84/464 |
| 5,501,131 A * | 3/1996 | Hata ........... 84/464 R |
| 5,509,343 A | 4/1996 | Hsu ............. 84/418 |
| 5,739,457 A * | 4/1998 | Devecka .......... 84/743 |
| 5,796,025 A * | 8/1998 | Haake ............ 84/464 R |
| 5,922,981 A | 7/1999 | Ballister ........... 84/464 |
| 6,417,439 B2 | 7/2002 | Uehara et al. ....... 84/645 |
| 6,570,078 B2 | 5/2003 | Ludwig ........... 84/600 |
| 6,610,917 B2 | 8/2003 | Ludwig ........... 84/726 |
| 6,689,947 B2 | 2/2004 | Ludwig ........... 84/721 |
| 7,227,075 B2 * | 6/2007 | Chang et al. ....... 84/645 |
| 7,228,190 B2 * | 6/2007 | Dowling et al. ........ 700/94 |
| 7,342,164 B2 * | 3/2008 | Nishibori et al. ....... 84/464 R |
| 2002/0062726 A1 * | 5/2002 | Abe ............. 84/464 A |

\* cited by examiner

*Primary Examiner*—Jeffrey Donels
(74) *Attorney, Agent, or Firm*—Ronald M. Anderson

(57) ABSTRACT

A lighting display master controller responds to an electronic vibration signal produced by a sensor when an instrument is played, to selectively energize light sources of different colors in a predefined pattern. The master controller energizes specific light sources of a desired color by selecting a row and column within an array. In one embodiment, the light sources are on a flexible substrate disposed within an optically transparent plastic sheath that is attached to the instrument. The pattern applied in selectively energizing light sources can be stored or transmitted in real-time from a concert controller host or personal computer. The light system can also be used to enable a student to practice and record a sequence defined by an instructor. The lights that are energized provide visual cues to the student, and the recording that is made enables the instructor to evaluate the student's performance.

34 Claims, 9 Drawing Sheets

LIGHTING DISPLAY RESPONSIVE TO VIBRATION

BACKGROUND

While our enjoyment of music depends primarily on our sense of hearing, it is possible to expand the range of sensations experienced when listening to a band or other source of music to include the visual realm and thereby greatly enhance the listener's enjoyment. Various techniques are often employed to enhance the lighting of a stage on which musical entertainment is provided, ranging from colored stage lighting that is changed to suit the mood of the music currently being played, to laser or other complex light shows that are arranged to complement entertainment being experienced by the audience.

Light shows in which various colored lights are controlled in response to the amplitude and frequency of the music being played have been available for a number of years. Some prior art devices that control light sources used in lighting shows are designed to respond to a music signal before the signal is amplified to drive loudspeakers, while others are designed to be driven by the amplified signal that is applied to the speakers. Bandpass filters in these devices can provide a control signal that is used to energize a specific color of light associated with a range of frequencies in the input music signal, and these devices can control the intensity of the light source as a function of the amplitude of the music signal within the range of frequencies associated with the light source. For example, higher frequencies in a music signal might control the intensity of yellow lights, while mid-range frequencies control red lights, and bass frequencies control blue or green lights. In virtually all of these prior art controllers, the sound signal is sampled through bandpass filters, either before or after it is amplified by a power amplifier, to derive the control signals that control the lights of various colors. These types of lighting displays thus tend to be centrally disposed and controlled by a single controller. If used with a group of live musicians (and not to create lighting effects for previously recorded music), the light show provided by such prior art systems is normally not associated with just a single instrument or provided for each of a plurality of instruments being played.

A more interesting lighting enhancement could be provided by enabling a specific instrument to include lights that provide a light show in response to that instrument being played. If light shows can thus be provided for each of a plurality of instruments, then each instrument can have and control its own lighting effects. Alternatively, it might be desirable for one or more instruments in a group to directly control lighting effects that are separate from the instruments. The lighting effects might be based upon the actual vibrations of the instruments when played, instead of the processed sound signals that will be used to drive loudspeakers or monitors. This level of versatility has not been provided in connection with currently available light show systems that respond to electrical sound signals that are used to drive loudspeakers. It would thus be desirable to enable an instrument to directly control a lighting effect included with the instrument or alternatively, to control a more remote light source in response to the vibrations produced by the instrument as it is played.

Another function that has not been realized in lighting systems responsive to electrical sound signals used to drive loudspeakers is to provide an indication of the quality of play by a musician who is playing an instrument. For example, it would be desirable to determine the timing accuracy of a drummer striking a drum relative to the beat indicated on a musical score. Providing an immediate visual feedback indicative of the performance would be useful to enable the musician to improve during practice. In addition, the vibration of an instrument being played can provide a recordable signal that can later be compared to an optimal performance to enable an instructor to evaluate the performance of a student musician. Thus, it would be desirable to employ a signal that is usable to control a light show, for these additional purposes. Again, the currently available lighting systems do not provide any comparable functionality.

A signal produced in response to the vibration of an instrument might be conveyed either via a wire or wirelessly, to a controller that is used for the above-noted functions or other such functionality. By enabling vibration sensors associated with each of a plurality of instruments to convey a corresponding signal to a controller, and control signals produced by the controller to be securely conveyed to one or more sets of light sources, a variety of different lighting effects might be produced in response to the instruments. For wireless communications, it would be important to secure the signals and avoid interference between the signals for each of the instruments in a band. Again, these issues do not appear to be addressed by conventional lighting systems.

SUMMARY

Accordingly, an exemplary lighting system has been developed that is responsive to vibrations produced by an instrument being played. This exemplary lighting system includes a vibration sensor adapted to be disposed on an instrument, which produces an electronic vibration signal in response to vibrations of the instrument when the instrument is played. A signal processor is coupled to the vibration sensor to receive the electronic vibration signal and in response thereto, produces a plurality of drive signals in accord with a predefined logic. A plurality of light sources are coupled to the signal processor and are energized in response to the plurality of drive signals. These light sources produce light according to the predefined logic.

In one embodiment, the plurality of light sources comprise a plurality of lights of different colors. The predefined logic determines which lights of a specific color are energized at a given time, at least in part, in response to the electronic vibration signal. In at least one of the embodiments, the plurality of light sources are configured as an elongate flexible band that is adapted to be attached to the instrument, so that light emitted by the plurality of light sources is visually associated with the instrument that is producing the vibrations used in controlling the plurality of light sources.

The predefined logic defines one or more parameters used for a lighting effect. For example, these parameters can include an intensity of each light source that is energized, a duration for energizing each light source, a spatially visual pattern produced by the plurality of light sources when energized, and a sequence for energizing the plurality of light sources.

The plurality of lights in at least one embodiment comprise light emitting devices that are mounted on a substrate in at least one array. The substrate is flexible and further includes a flexible transparent cover through which light emitted by the plurality of light emitting devices is visible.

In one exemplary application, the instrument is a drum, and the vibration sensor is adapted to be mounted to sense vibrations of the drum as it is being played.

Optionally, a communication link can be included that couples to a controller in which the signal processor is disposed. The communication link can include either a wired link, or a wireless link, depending upon the desired application of this exemplary system. If a wireless link is employed, it can communicate a digital data signal corresponding to the electronic vibration signal. Optionally, the digital data signal can be in an encrypted format and can optionally include an identifier that is associated with the vibration sensor, and thus, with an instrument on which the vibration sensor is disposed.

It is contemplated that the invention can be used in connection with a plurality of different instruments. In an exemplary application of this type, at least one additional set of a plurality of light sources are included. Also, at least one additional vibration sensor can optionally be included to produce an electronic vibration signal in response to vibrations of the at least one additional instrument. The controller can thus be coupled to receive trigger signals responsive to at least one vibration sensor disposed at a remote location, over the communication link. In response, it produces drive signals to drive each of a plurality of different light sources in accord with the predefined logic and in response to the electronic vibration signal produced by the at least one vibration sensor.

In another exemplary embodiment, there is a data link that is adapted to couple to a computing device on which a set of machine instructions are executed. These machine instructions cause the computing device to provide a user interface for selecting parameters for the predefined logic that define one or more lighting effects.

Another aspect is directed to a method for controlling a plurality of light sources in response to vibrations of an instrument. This exemplary method includes the steps of sensing vibration of a portion of the instrument while the instrument is being played, and producing an electronic vibration signal in response thereto. The plurality of light sources are then controlled in response to the electronic vibration signal so that they produce light in accord with a predefined logic. Other features and functionality of the method are generally consistent with the above discussion of the exemplary system.

This Summary has been provided to introduce a few concepts in a simplified form that are further described in detail below in the Description. However, this Summary is not intended to identify key or essential features of the claimed subject matter, nor is it intended to be used as an aid in determining the scope of the claimed subject matter.

DRAWINGS

Various aspects and attendant advantages of one or more exemplary embodiments and modifications thereto will become more readily appreciated as the same becomes better understood by reference to the following detailed description, when taken in conjunction with the accompanying drawings, wherein.

Figure 14:
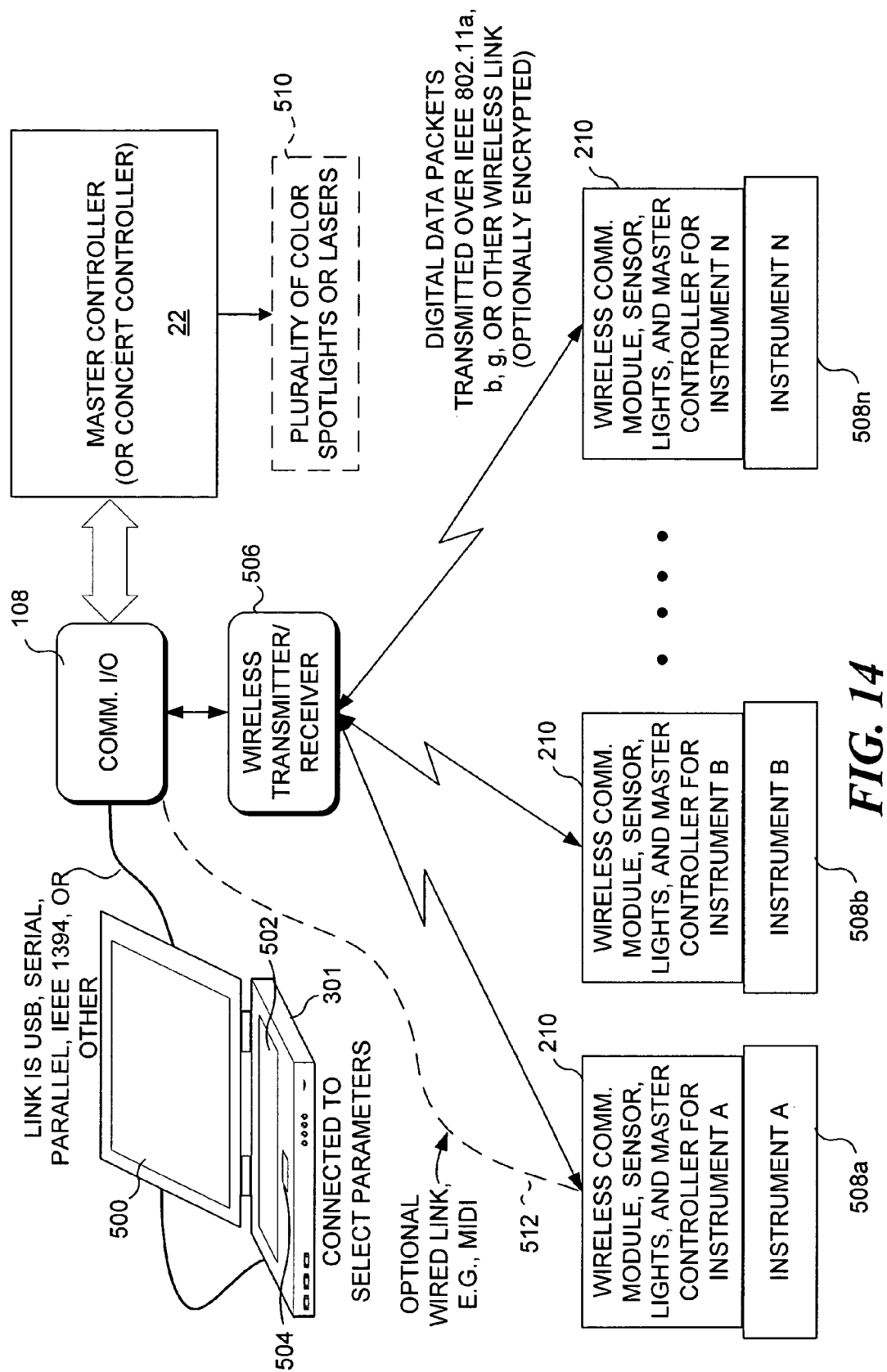
Figure 15:
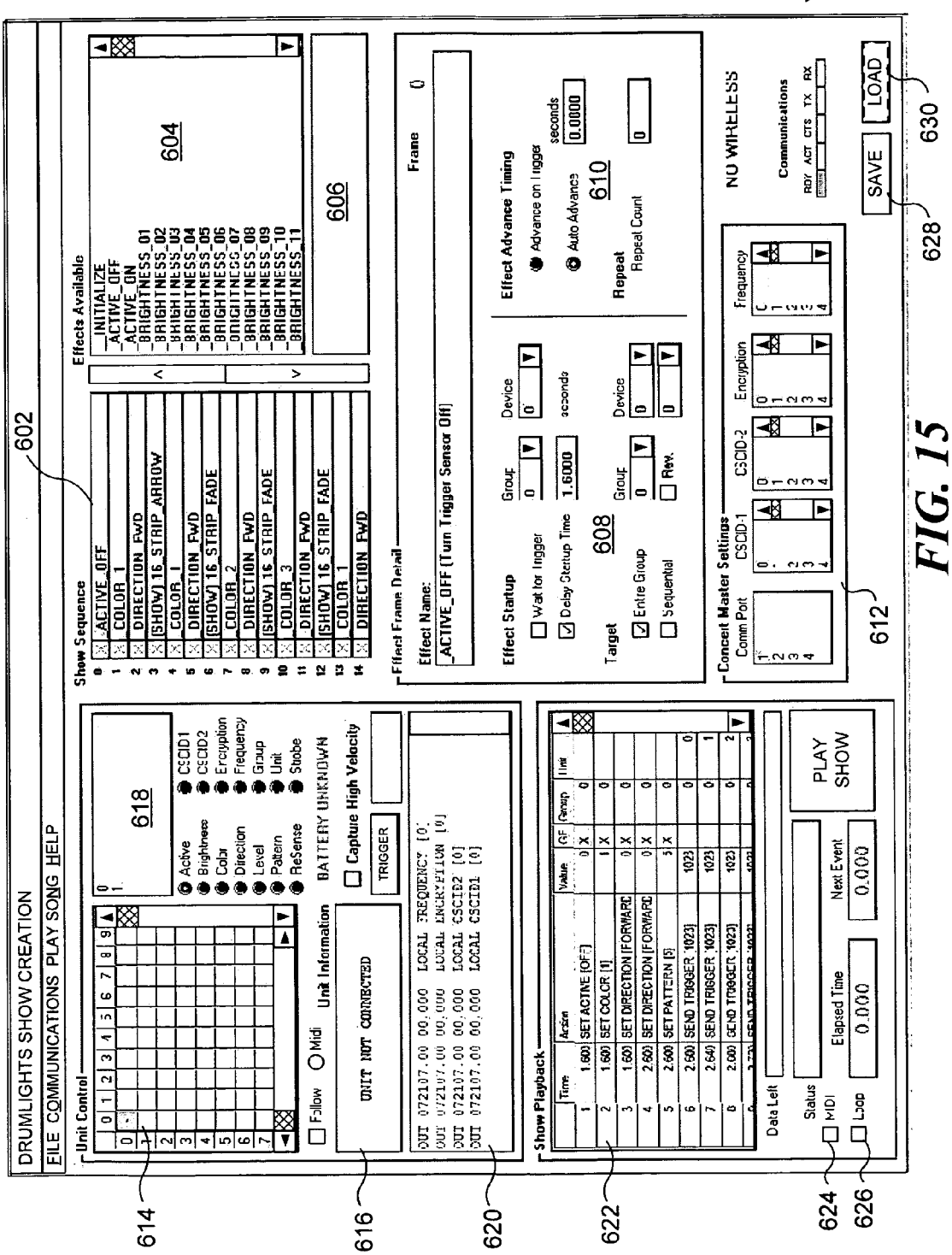

FIG. 14 is a diagram illustrating one example of a PC coupled to a master controller and coupled in wireless communication (or wired communication) with a plurality of master controllers that are associated with a corresponding plurality of instruments; and FIG. 15 is an exemplary graphic user interface for entry and editing of parameters used for creating a lighting show that employs one or more master controllers to control lighting effects implemented with one or more flexible bands of lights and optionally, also using other light sources.

DESCRIPTION

Figures and Disclosed Embodiments Are Not Limiting

Exemplary embodiments are illustrated in referenced Figures of the drawings. It is intended that the embodiments and Figures disclosed herein are to be considered illustrative rather than restrictive.

Exemplary Lighting System Overview

Figure 1:
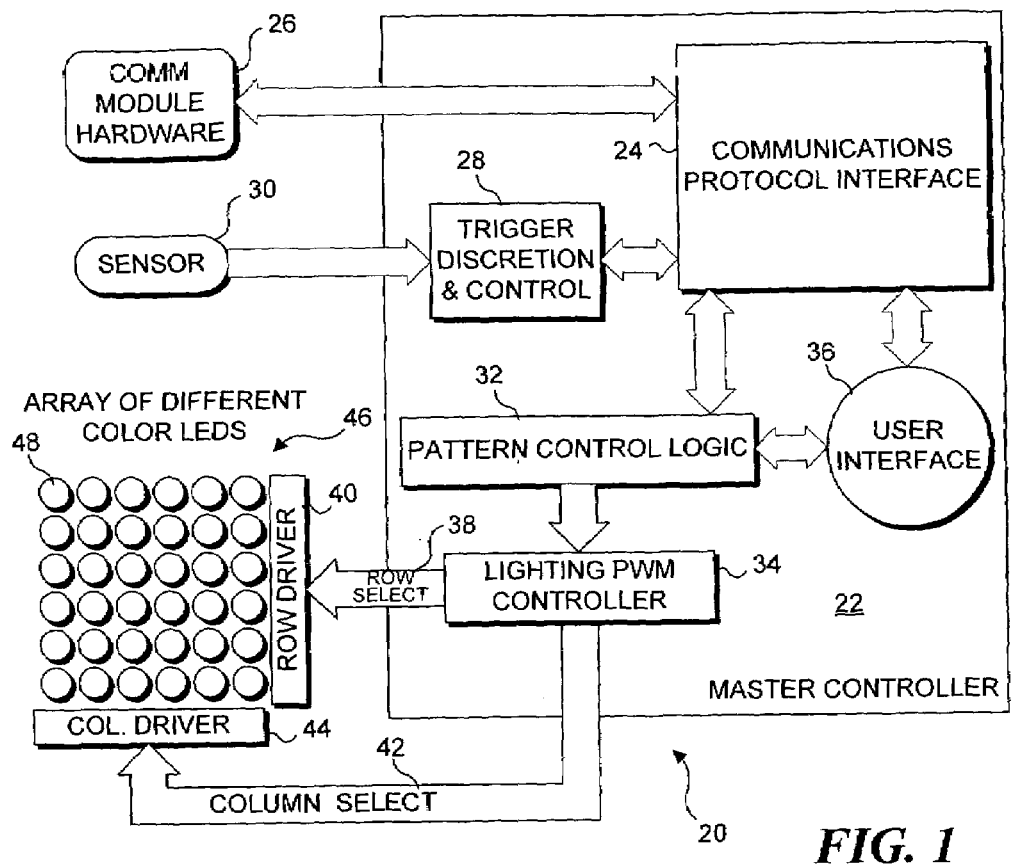
FIG. 1 is an exemplary functional block diagram of a master controller used for controlling an array of different color light sources in response to a signal from a sensor.

FIG. 1 illustrates an exemplary lighting system 20 that is responsive to vibrations produced when a musical instrument is played. Lighting system 20 includes a master controller 22, which is typically removably attached to the musical instrument to which the lighting system responds. Included within master controller 22 is a communications protocol interface 24, which is electronically coupled to communication module hardware 26, through which the master controller communicates with other external devices, as explained below. A trigger discretion and control block 28 receives an electronic vibration signal from a sensor 30 that is adapted to be mounted so as to sense vibrations of the musical instrument (not shown) to which the lighting system responds. The trigger discretion and control block responds to the electronic vibration signal, producing an input to communications protocol interface 24. A pattern control logic block 32 is coupled to communications protocol interface 24, as well as to a lighting pulse width modulator (PWM) controller 34, and a user interface 36. The lighting PWM controller produces a row select signal 38, which is applied to a row driver 40 and a column select signal 42, which is applied to a column driver 44. The row and column drivers respectively determine specific light sources 46 that are energized.

In this exemplary embodiment, light sources 46 comprise an array of different color light emitting diodes (LEDs) 48, although other types of light sources, such as laser diodes, could instead be used. Although light sources 46 are shown in this illustrative embodiment as being configured in a 6×6 array having two dimensions, in at least one exemplary embodiment (shown and discussed below in connection with FIG. 12), the light sources comprising the array are actually arranged in a single linear array, e.g., spaced apart in a continuous line. Using the electronic vibration signal produced by sensor 30 as representative of a musical beat, specific colors of the LEDs can be energized at specific locations, in many different patterns that define lighting effects. Furthermore, the relationship of the electronic vibration signal to the timing with which the LEDs are energized can be varied as desired, to achieve an almost unlimited number of different lighting effects.

One of the advantages of using lighting PWM controller 34 to selectively energize light sources 46 is that by applying a PWM current with pulses having a short on time relative to the off time, it is possible to minimize the average electrical current required to energize the different color LEDs. For example, one embodiment uses an on-time of approximately 0.001 seconds and an off time of about 0.009 seconds for each LED being energized, for a 1:10 duty cycle. Use of PWM current also enables relatively thin traces on a flexible substrate (shown and discussed below in connection with FIG. 12) to be employed to carry the required current without overheating and enables the LEDs to be brightly illuminated without the pitting or damage that would normally be caused by using a continuous electrical current of the magnitude required to achieve the same intensity of the LED light output. In addition, since a battery power supply will typically be included with the lighting system used on each instrument to provide this electrical current, a PWM electrical current minimizes battery drain, extending the useful time that the lighting system can be continuously operated without replacing the batteries, compared to a continuous current.

Figure 2:
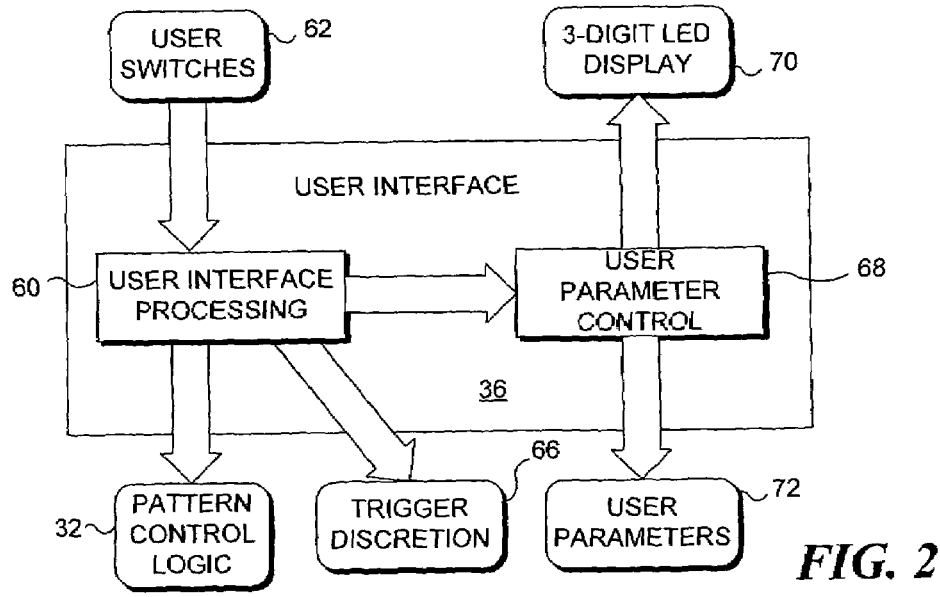
FIG. 2 is an exemplary functional block diagram of a user interface included in the master controller of FIG. 1.
Figure 10:
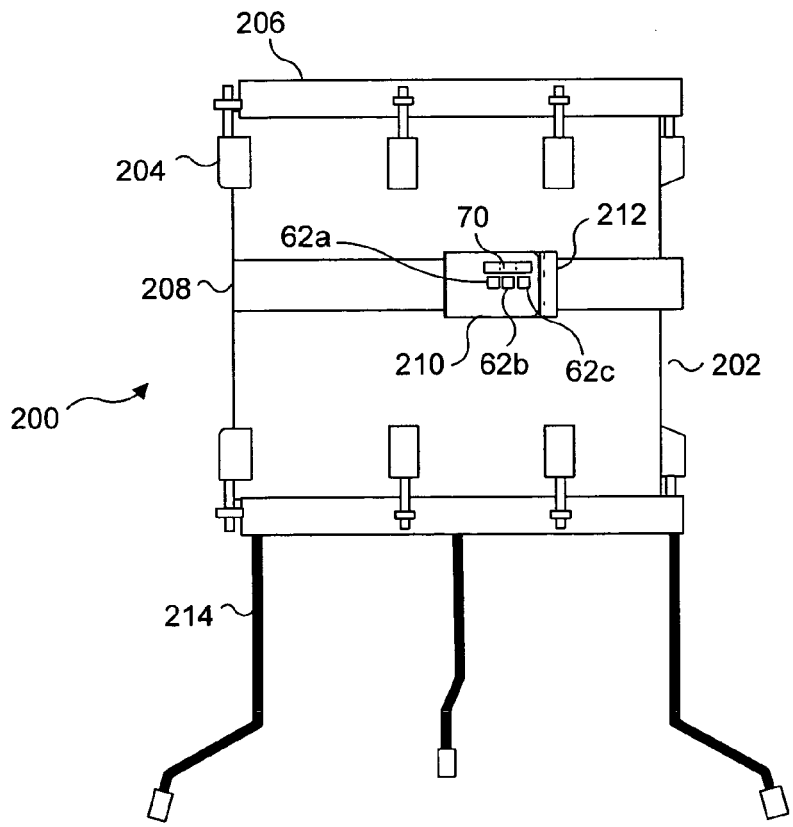
FIG. 10 is side elevational view of a drum fitted with the master controller and a flexible band that includes a plurality of different colored light sources controlled by the master controller.

FIG. 2 illustrates details of an exemplary user interface 36. In this illustrative embodiment, user switches 62 are pushbutton switches provided on the user interface of the lighting system and (as shown in FIG. 10, but not in FIG. 2), include a function switch 62a, and a "down" switch 62b, and an "up" switch 62c. Function switch 62a turns the power on to the unit when depressed while the master controller is initially de-energized and then cycles through each of the lighting effect parameters that can be set (e.g., color, pattern, direction of lights being energized, etc.) and is also employed for setting other parameters, including a unique identification (ID) for the master controller to distinguish it from any other master controller that may be communicating with a concert controller (as discussed below). User switches 62 are coupled to a user interface processing block 60, which is connected to pattern control logic 32 and to trigger discretion control block 66. The trigger discretion block is employed for setting the trigger level applied in responding to the electronic vibration signal. In addition, user interface processing block 60 is connected to a user parameter control 68, which enables the user to selectively change a user parameter 72 in memory, while observing the effect of the change on a three-digit LED display 70.

Figure 3:
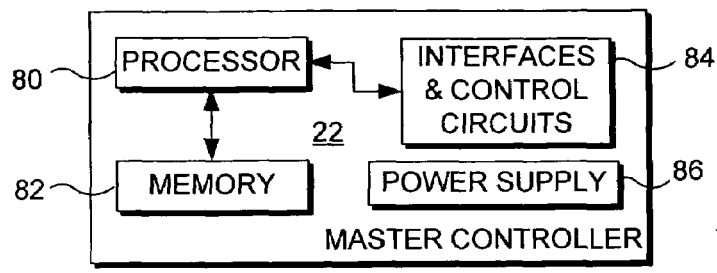
FIG. 3 is a high level block diagram of one embodiment of the master controller implemented using a processor that executes instructions stored in a memory.

One exemplary block diagram of an embodiment of the master controller is illustrated in FIG. 3. This embodiment includes a processor 80, a memory 82 (having both random access memory (RAM) and read-only memory (ROM)), and a block 84 representing the interfaces and control circuits included within the master controller, as indicated in FIG. 1. In addition, a power supply 86 is provided for the master controller and will typically include one or more batteries (not separately shown) or alternatively, can comprise an alternating current (AC) line energized power supply of generally conventional design.

Figure 4:
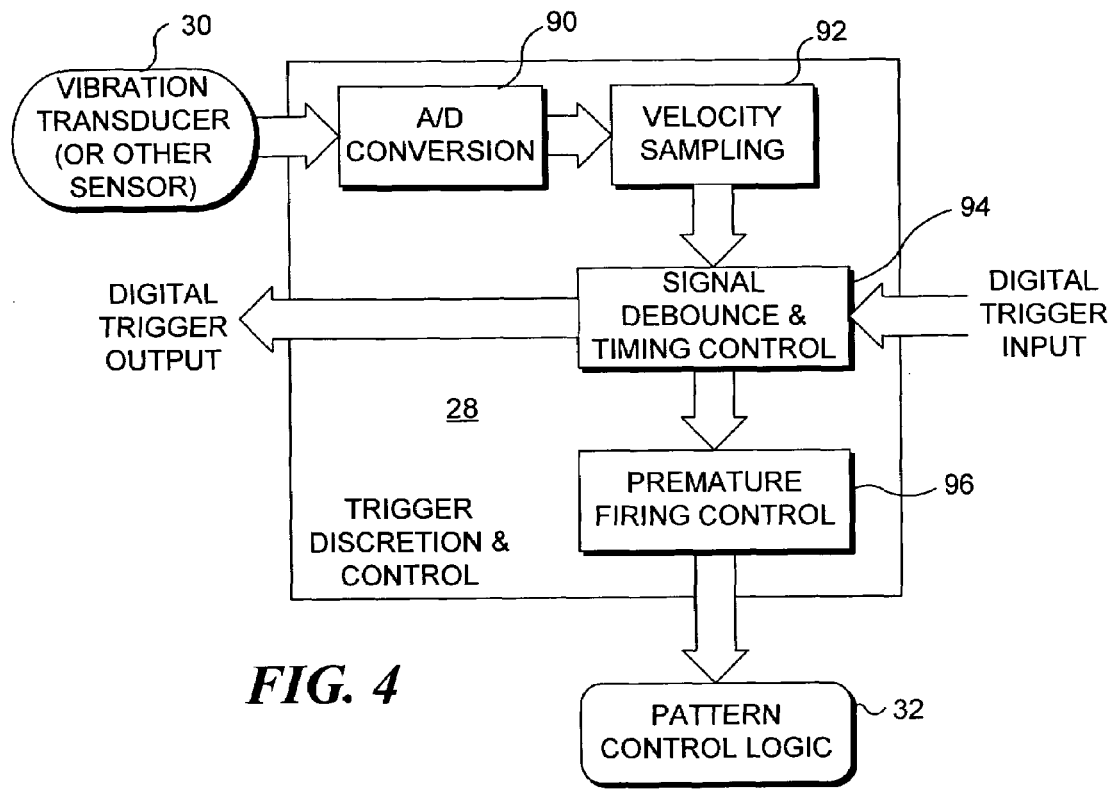
FIG. 4 is an exemplary functional block diagram of a trigger discretion and control included in the master controller of FIG. 1.

FIG. 4 illustrates details of trigger discretion and control block 28, which processes the electronic vibration signal. A prototype of the lighting system currently uses a vibration transducer for sensor 30 to produce the electronic vibration signal, but other types of sensors can alternatively be used to detect the vibration of the musical instrument to which the lighting system responds. Sensor 30 might alternatively be a microphone, a mechanical switch, an audio filter, or other suitable device that responds to the play of an instrument. The electronic vibration signal produced by sensor 30 is conveyed to an analog-to-digital conversion block 90, producing a corresponding digital signal that is input to a velocity sampling block 92, which determines the rate of change of amplitude over time for the digital form of the electronic vibration signal. The resulting velocity values are input to a signal debounce and timing control block 94, which filters the velocity signal to eliminate noise and also produces a local output signal, while producing a corresponding digital trigger output. Thus the digital trigger output is a logic level high (e.g., a +5 volts DC) pulse that is produced each time a trigger is detected in response to the vibration sensor, which happens at the same point in time that the pattern logic is activated. The digital trigger input is a corresponding logic level high input from another master controller or other remote device; when the vibration sensor is disconnected, the remote device can thus control the lighting effects for the local device with the digital trigger input it provides. Multiple master controllers can thereby be daisy chained, by coupling the digital trigger output on a master controller to the digital signal input of a successive master controller in the chain.

The filtered output from signal debounce and timing control block 94 is applied to a premature firing control block 96, which produces a signal that is applied to pattern control logic 32. The pattern control logic controls the pattern with which the different color LEDs 48 are energized, in time with the beat of the instrument that is being played to control the light show, or alternatively, in time with another signal that is supplied for this purpose, such as a musical instrument digital interface (MIDI) input signal.

Where the instrument being played is a drum, each beat of the drum that produces an electronic vibration signal above a predefined threshold can initiate a pattern with which LEDs of one or more colors are energized in a sequence or simultaneously. For example, a first beat may initiate a pattern wherein red LEDs blink twice, followed by three longer duration blinks of blue LEDs, followed by a short duration blink of white LEDs. During the time that a given LED is energized, the PWM electrical current is actually pulsing the LEDs on and off at a rate too rapid to be visible to the human eye so that the LED appears to be continuously energized during the duration of a blink in the pattern. The next beat may repeat this pattern, or be used to initiate a different pattern. Optionally, each beat may be used to only cause a single color light source to be energized, or to energize multiple color light sources simultaneously.

Figure 5:
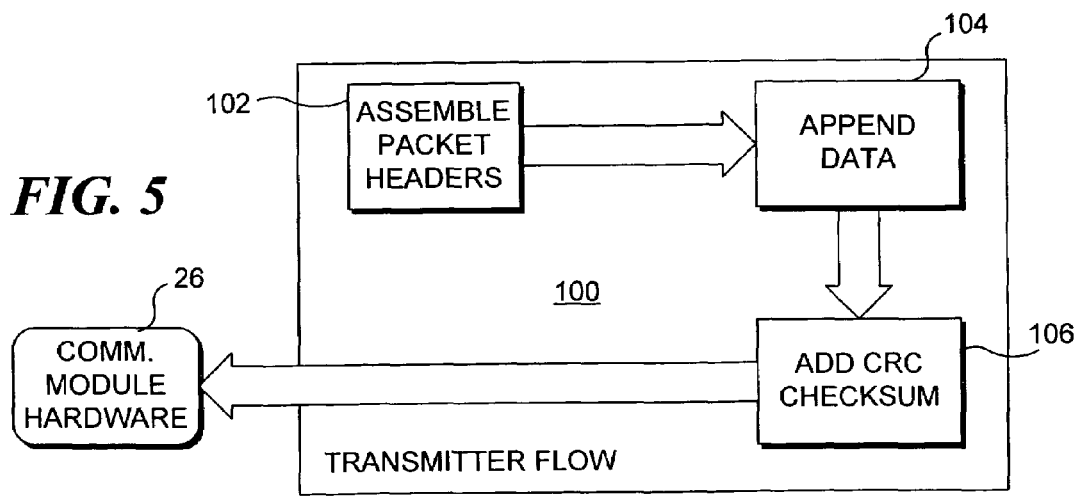
FIG. 5 is an exemplary functional block diagram of a transmitter flow block that is coupled to a communications hardware module for transmitting packets from the master controller.

Master controller 22 is able to communicate with other devices through communication module hardware block 26. FIG. 5 illustrates a transmitter flow module 100 that is part of communications protocol interface 24 and which enables communication with digital packets through communication module hardware block 26. In this Figure, a block 102 assembles packet headers and provides a unique address for each recipient intended to receive the data packets. A block 104 then appends the data to the packet headers, readying the packets for transmission. A block 106 adds a cyclic redundancy check (CRC) value to the packets so that after they are transmitted through communication module 26 to another device such as another master controller, or a concert controller, which is discussed below, the packets can be checked to determine if any changes have occurred in their content during the transmission.

Figure 6:
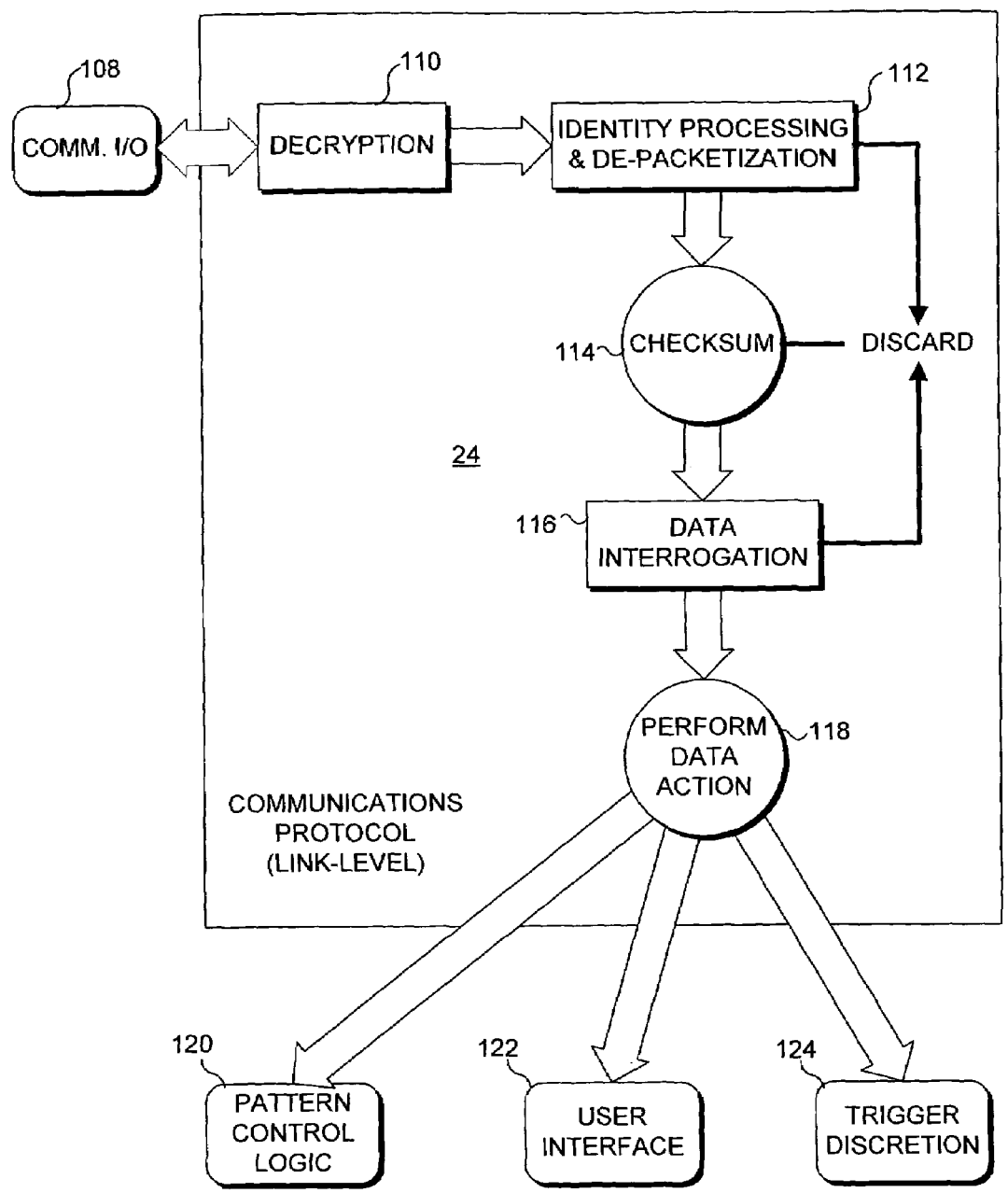
FIG. 6 is an exemplary functional block diagram of a communications protocol block (at a link level) that is used in the master controller of FIG. 1.

FIG. 6 illustrates further details of communications protocol 24 as used for link-level communications. In the example shown, data packets are received through communication input output block 108, which is implemented by communication module hardware 26. Although not required, it is generally preferable to encrypt data packets transmitted between devices to avoid some other device capturing data packets intended for a different device, and/or modifying communications taking place between two or more devices. Encrypted data packets received through communication input output block 108 are input to a decryption block 110, which decrypts the encrypted data packets, deriving the unique ID that is part of the data packet header. The remainder of the data packet and ID are then input to an identity processing and de-packetization block 112, which discards any data packets not intended for the master controller that is attempting to process the data packets. However, if the data packets are intended for that master controller, they are next output to a checksum block 114, which determines if the data packets have been altered since they were originally transmitted either as a result of changes occurring naturally during transmission, or by a third-party changing the data packets. If the checksum value of a received data packet does not agree with that of the data packet as transmitted, the data packet is again discarded. For those data packets that pass the checksum test, a data interrogation block 116 processes the data to determine any control action or data values that are conveyed thereby. Unusable data are again discarded. The output from data interrogation block 116 is applied to a block 118, which performs the data action. For example, the data may be supplied to pattern control logic 120 for use in defining a pattern to be implemented with the array of LEDs to create a lighting effect. Or alternatively, as a further example, the data may be input to user interface 122, causing a value or other parameter to be changed and/or to be displayed to the user, or the data may be input to a trigger discretion block 124 for modifying the trigger level used in processing the electronic vibration signal. The data input can be conveyed over either a wired or wireless link.

Figure 7:
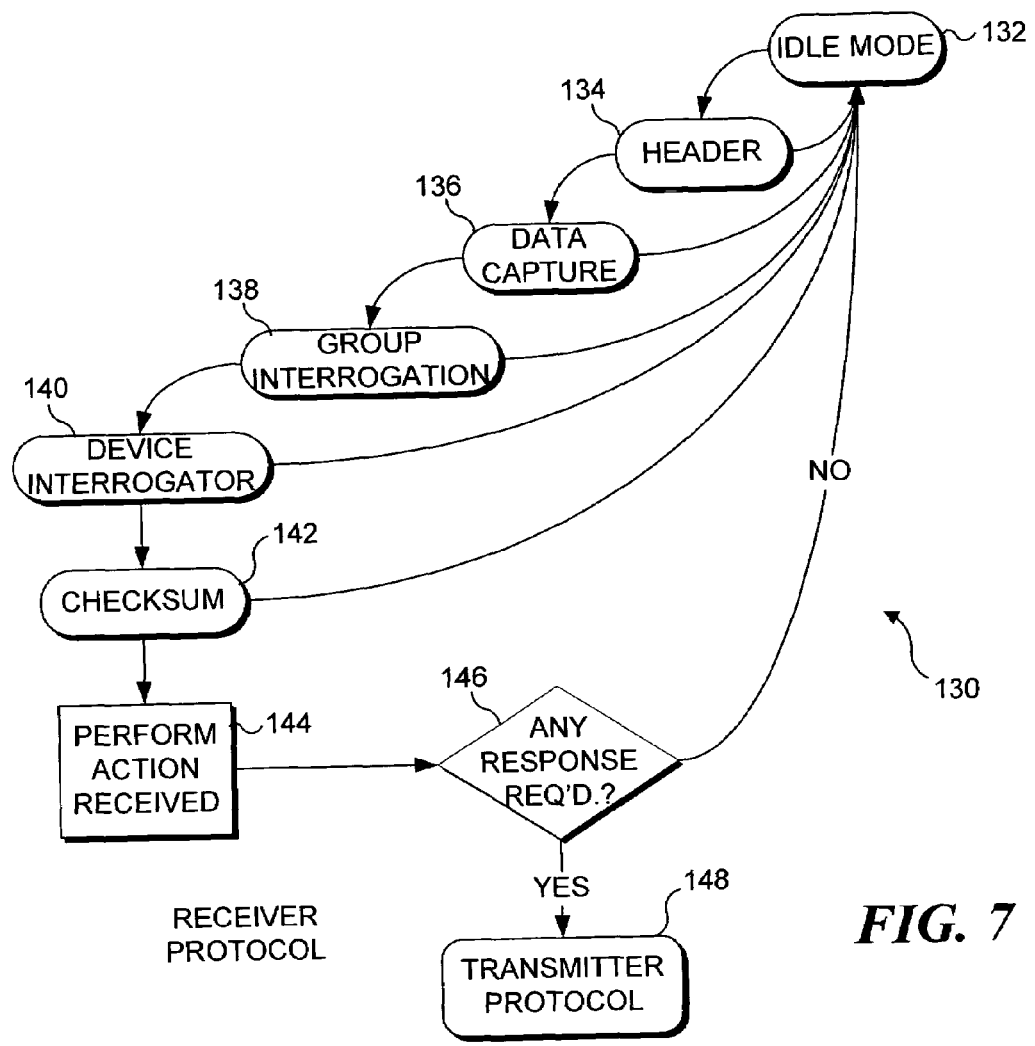
FIG. 7 is a logical flow diagram showing the steps implemented by one embodiment of the master controller of FIG. 1.

Sequential logical steps 130 employed by the master controller in communicating with another device are illustrated in FIG. 7. Beginning at an idle mode 132, an incoming data packet is received and decrypted. In a block 134, its header is processed to determine whether the master controller receiving the data packets is at least one intended recipient. If so, data conveyed by the data packets are captured in a block 136. Otherwise, the master controller returns to idle mode 132. If an error arises in the data capture, the master controller also returns to idle mode 132.

A group interrogation block 138 determines if the data are interrogating the master controller as part of a group that includes a plurality of master controllers. If not, the master controller returns to idle mode 132. Otherwise, the logic proceeds to a block 140 corresponding to the device interrogator, to respond to the interrogation. A block 142 provides for checking the value of a checksum to determine if any changes have occurred within the data packets since they were transmitted, and if so, idle mode is again the default. Otherwise, a block 144 provides for performing the action indicated in the received data packets. A decision block 146 determines if any response is required from the master controller processing the data packets, and if so, the logic proceeds to a transmitter protocol block 148 for creating and transmitting the response. However, if no response is required, the logic again returns the master controller to idle mode 132.

Figure 8:
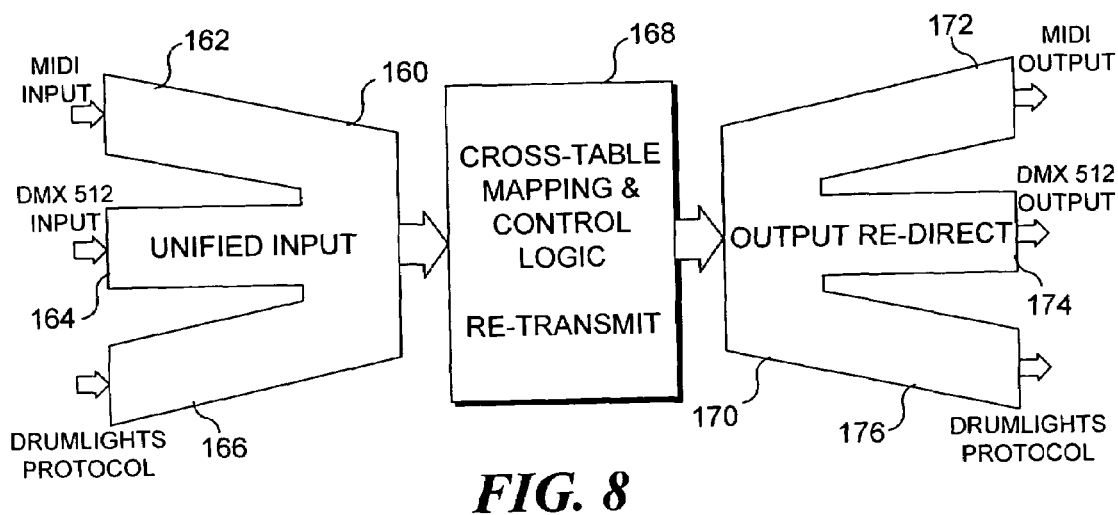
FIG. 8 is an exemplary schematic diagram showing the mapping of inputs to outputs by the master controller.

Communication module hardware 26 (FIG. 1) is adapted to couple with a variety of different input and output data streams. As shown in FIG. 8, a unified input 160 can accept several different inputs, including a MIDI input 162, a digital multiplex (DMX)512 protocol input 164, and a drumlights protocol input 166. A cross-table mapping and control logic and retransmit block 168 can process each of these data streams that are input and produce any of three different corresponding outputs using an output redirect function 170. The output redirect function can produce different format outputs including, a MIDI output 172, a DMX512 protocol output 174, and a "drumlights" protocol output 176. Thus, the array of different colored LEDs can also be controlled in response to a MIDI or DMX512 protocol input signal, as well as in response to the electronic vibration signal produced by sensor 30, which is a trigger event that is part of the drumlights protocol. Also, the DMX512 protocol output signal can be used to control conventional theatrical lighting or other effects that are designed to receive a DMX512 protocol control signal. For example, DMX512 protocol output 174 can be used to control pyrotechnics or smoke machines. Thus, a cannon could be fired in response to the DMX512 protocol output during the play of the "1812 Overture." The MIDI output signal can be used to control lighting that is designed to respond to a MIDI input signal or can be recorded, for applications such as that discussed below.

In general, the term "protocol" includes events and commands. When an instrument is played, e.g., a drum is strick, the electronic vibration signal is used to produce a trigger signal that is sent out the communications port and/or used to trigger one or more lighting effect(s). If a remote device, e.g., a concert controller, wants to simulate a trigger on a master controller with which it is in communication, the remote device can send a "command trigger" with some velocity information indicative of the force of a drum strike or other user play action. Anytime a user changes a parameter value with a user parameter control, a "function change" event is caused to be sent over the communications channel. There are also "function change" commands that can be sent and received over this channel. The protocol enables a response to be made where a remote device sends a query for the value of any of the parameters set on the master controller. Values retrievable by the protocol include the battery strength, serial number, firmware version, etc. The protocol also enables a user to create custom lighting patterns using a predefined set of pattern parameters.

In addition to simply producing an effect comprising a pattern of different colored lights, in response to the electronic vibration signal, or a MIDI input signal, or a DMX512 protocol input signal, the master controller is also useful in educational applications. For example, a student who is learning to play a musical instrument such as a drum set can use the lighting system during practice sessions to provide visual cues relating to the beat that should be applied in striking specific drums in the drum set. In addition, by playing previously recorded MIDI data corresponding to a desired practice sequence, for example, the student can also listen to how the practice sequence should be played for comparison to the student's performance. The array of LEDs provide a visual cue about the timing for striking a specific drum and can indicate which drum in a drum set to strike. Furthermore, a student can be evaluated by an instructor based upon a recording of the practice session that indicates how accurately the student has struck a drum in accord with the practice sequence or musical score provided by the instructor.

Figure 9:
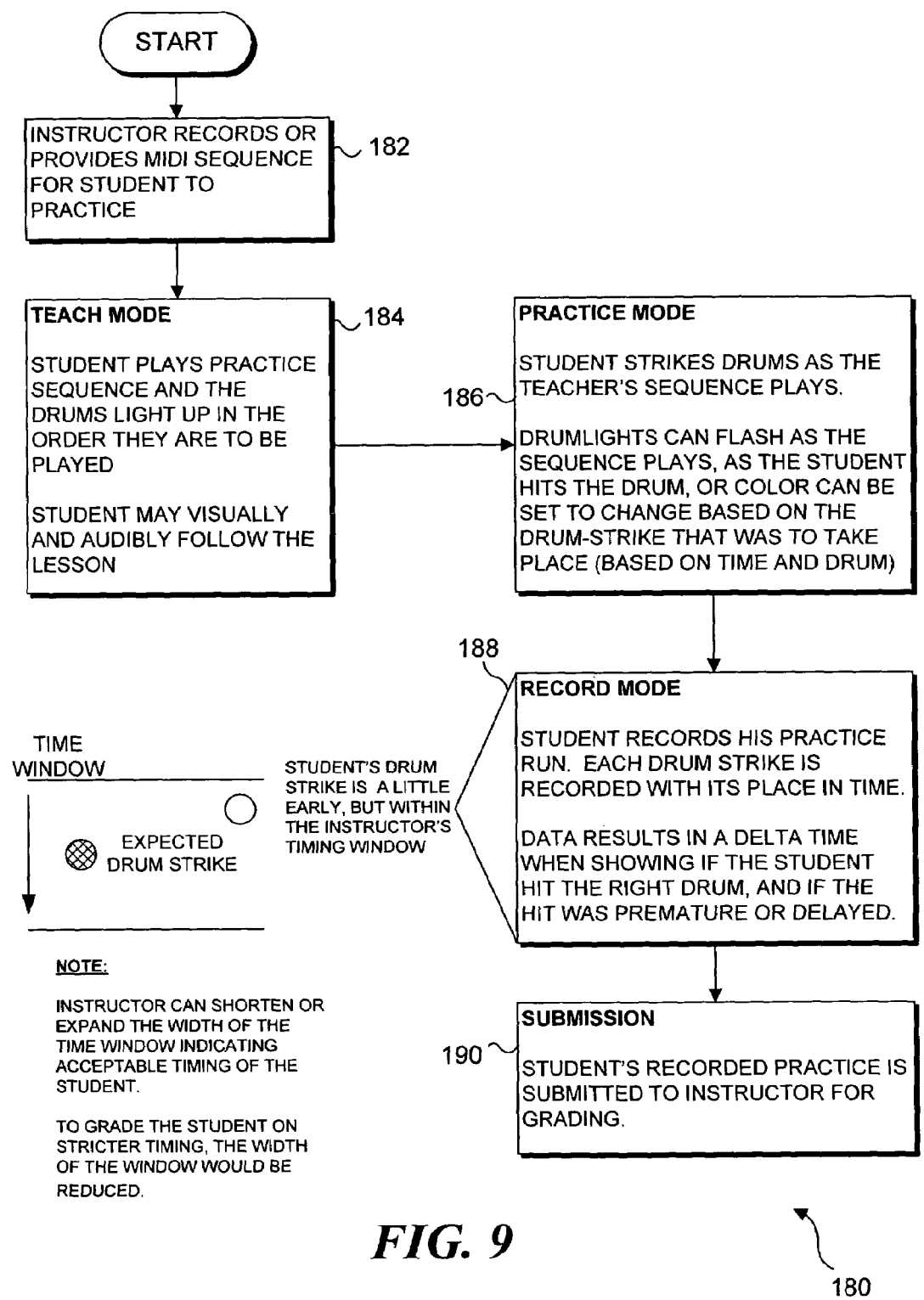
FIG. 9 illustrates the interaction and various modes employed in an educational application of the lighting array and master controller.

Details showing exemplary steps 180 for an educational application of the lighting system are shown in FIG. 9. After this logic starts, a block 182 indicates that the instructor records or otherwise provides a MIDI sequence for a student to practice. This sequence could be provided on any suitable memory media such as a floppy disk, universal serial bus (USB) memory device, CD-ROM, or DVD that is usable with a personal computer or other computing device, including those associated with a sequencer, electronic keyboard, or other type of electronic music device.

In a teaching mode, as indicated in a block 184, the student plays the practice sequence, and the array of LEDs that are coupled to the drum being played by this student light up in the order that they are to be played, based upon the MDI practice sequence that was provided by the instructor. As noted above, the student may visually and audibly follow the lesson provided by the instructor. In a practice mode, as shown in a block 186, the student strikes the one or more drums as the teacher's sequence plays, following the visual prompts provided by the LEDs. The array of LEDs (or drumlights) can flash as each beat of the sequence is to be played by the student, or the color of the LEDs that are energized can be set to change, based upon the drum-strike that was to take place. Thus, a particular color LED might be lighted when the student is to strike the snare drums, while a different color LED is lighted when the student is to strike a bass drum.

A record mode 188 then enables a student to record the practice run. Each time the one of the drums in a drum set is struck by the student, the timing of the drum strike is recorded, as well as the specific drum being struck. The recorded data can be in the form of a MIDI data stream or in one of the other data stream formats, such as drumlights protocol, or DMX512 protocol, as discussed above. When the student strikes a drum, a delta between the time when the drum strike is expected and the time the drum strike actually occurred can clearly show if the student was accurate in maintaining the beat during the practice sequence recording. A time window provided relative to the expected drum strike can define an acceptable range for the actual drum strike relative to the expected drum strike. The example shown in FIG. 9 indicates the relation between an expected drum strike and a student's drum strike, indicating that the student's drum strike that was a little earlier than expected, but still within the acceptable timing window specified by the instructor. Based upon the experience level of a student, an instructor can readily shorten or expand the width of the timing window that indicates a range of acceptable timing, for each drum strike made by the student.

As indicated in a block 190, the student submits the recorded practice sequence to the instructor for grading. When grading the student's performance during a practice session, an instructor will compare the delta between the expected drum strike and the student's drum strike to determine, for example, the number of or percentage of drum strikes that were outside the timing window. Based upon the result, the instructor can apply either objective or subjective criteria in assigning a grade to the student. It is also contemplated that the student's performance can be evaluated by an instructor in real-time, by determining the time delta between the expected strike and the student's actual drum strike while the student is playing a drum (or other instrument).

Figure 11:
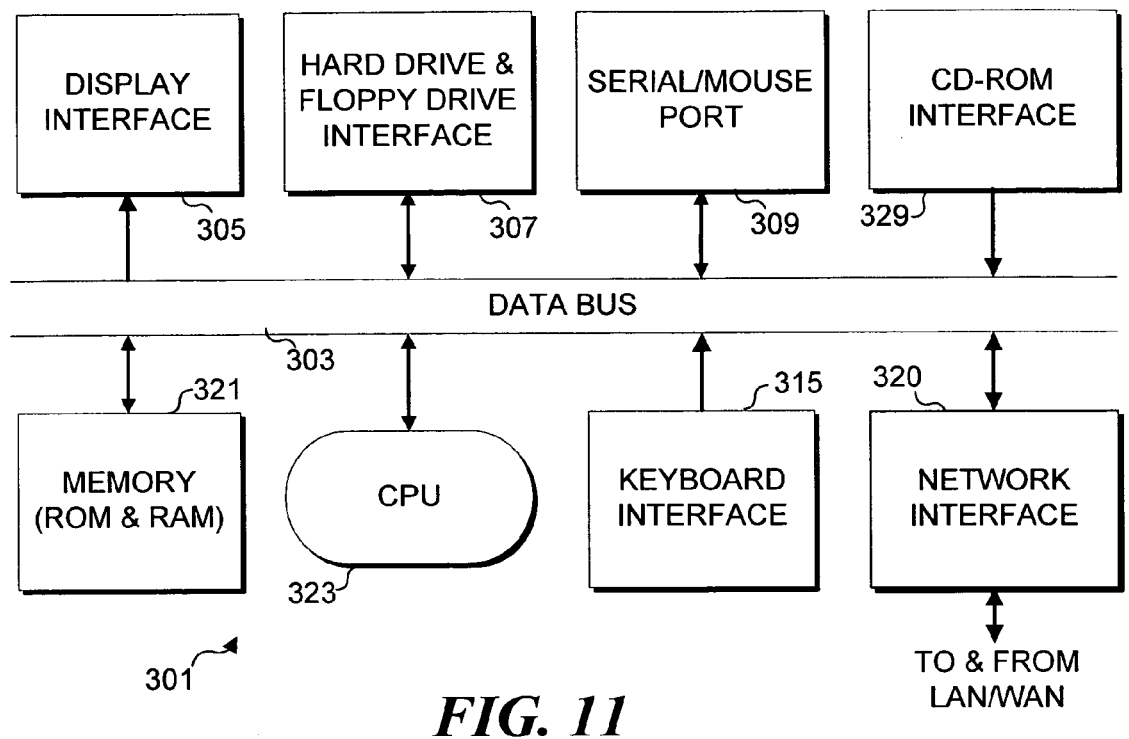
FIG. 11 is an exemplary functional block diagram of a generally conventional personal computer (PC), such as a laptop, that may be used for input of parameters of lighting effects used to create a light show and for other interaction with one or more selected master controllers.

As indicated above, the logical steps discussed in regard to FIG. 9 can be carried out in connection with playing, and recording a practice session to a memory medium, using a personal computer or other computing device. FIG. 11 is a functional block diagram 301 illustrating the basic components of an exemplary personal computer suitable for use with the master controller and array of lights sources, as discussed herein. A data bus 303 is providing for coupling the components in logical communication with each other. A display interface 305 is typically coupled to a display screen, such as a liquid crystal display (LCD), which is not shown. A hard drive and floppy drive interface 307 is appropriately connected to a hard drive, and/or floppy drive (or other nonvolatile memory device), which is also not shown. For user input, a serial/mouse port 309 is provided for connection to a pointing device such as a mouse, trackball, or touch pad (not shown), while a keyboard interface 315 is provided for conveying input supplied by a user through a keyboard. Machine instructions that carry out the functions implemented by the computing device in connection with the light system, as well as a machine instructions employed during boot up of the computing device are stored in a memory 321. Memory 321 includes both read only memory (ROM) and random access memory (RAM). These machine instructions are executed by a central processing unit (CPU) 323, to provide the desired functionality defined by the machine instructions. Optionally, a CD-ROM interface 329 can be coupled to data bus 303, as can a network interface 320. Network interface 320 enables the computing device to be employed to transmit and receive over a local-area network (LAN) or wide area network (WAN). Network interface 320 can also be connected to a wireless network for communicating with a master controller using wireless radio frequency (RF) communications, as discussed in greater detail below.

An exemplary drum 200 shown in FIG. 10 illustrates how one embodiment of the light system is coupled to the drum so that the different colored light emitted by the array of LEDs is visible in all-directions around drum 200. Drum 200 includes a cylindrical casing 202. Tensioning adjustments 204 are attached to the casing for use in adjustably tensioning a drumhead 206. In this embodiment of the light system, a flexible band 208 is wrapped around the circumference of cylindrical casing 202, about midway between the tensioning adjustments at the top and bottom of the drum. Drum 200 is supported on a stand 214.

The ends of flexible band 208 are coupled together with a clasp 210 that engages a clip 212. Clasp 210 forms a housing for the components of the master controller discussed above and serves to protect these components. Three-digit LED display 70 is visible on the face of clasp 210. The vibration sensor that picks up each beat of the drum is disposed within the housing of clasp 210 and is therefore not visible in any view included in the drawings. Vibration is picked up by the vibration sensor through housing, which is concave to contact a drum casing at least at two points, to facilitate transfer of vibrations from the drum case, through the housing, and into the vibration sensor. The concave shape of the housing undersurface also helps to self-center clasp 210 on the drum casing. While not separately shown in FIG. 10, a jack is provided on the side of clasp 210 to couple a lead to a remote sensor that is mounted in a different location on drum 200, such as on drumhead 206, or on a different instrument or different drum in a drum set. When the lead is connected to the jack, the internal vibration sensor is disabled.

Figure 12:
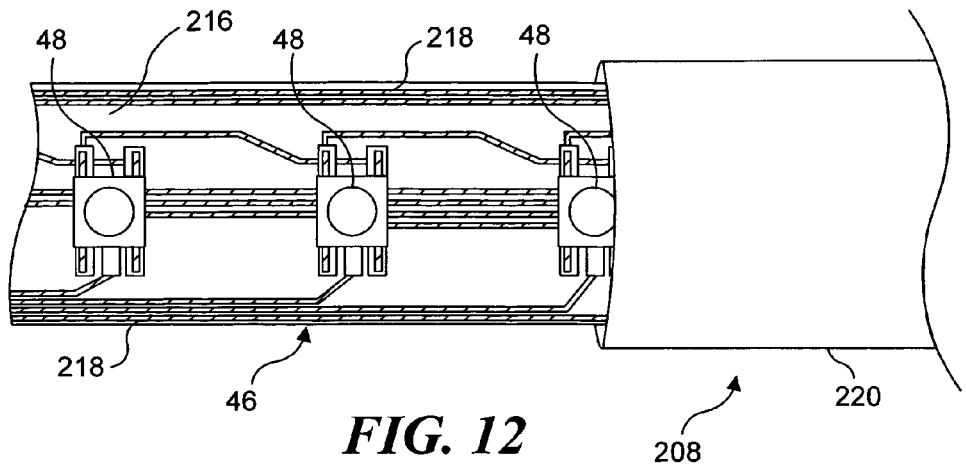
FIG. 12 is a cut-away view of one embodiment illustrating a portion of the flexible band and the lights, comprising "drumlights" adapted to be mounted to an instrument such as a drum.

Details of flexible band 208 are illustrated in FIG. 12. Flexible band 208 includes an optically transparent plastic sleeve 220, which protects arrays of different color LEDs 48 that are mounted on a flexible substrate 216 in a linear array 46' and are connected to the master controller through flexible traces 218, which are applied to the flexible substrate. Flexible traces 218 carry PWM current that enables specific LEDs of the desired color be selectively energized so that light emitted by the energized LEDs is transmitted through optically transparent plastic sleeve 220 and is visible to an observer watching a drum (or other instrument to which the flexible band is attached) being played. Each drum in a drum set may have its own flexible band 208 and master controller so that the light produced by the LEDs is associated with the beat of only that drum. Conversely, the beat of a single drum in a drum set may be used for controlling one or more flexible bands to selectively energize LEDs of the desired color within array(s) 46' of different color LEDs 48 included therein. It is also contemplated that other configurations or arrays for mounting the array of LEDs to instrument could be used. For example, a substantially wider (i.e., a more rectangular) configuration could employed, so that the LEDs comprising the array might then be distributed over a larger area, for example as two or more linear lines of LEDs on the flexible band. Also, other techniques such a hook and loop fastener, or a tacky adhesive coating might be used for attaching the array of light sources to the instrument being played.

Figure 13:
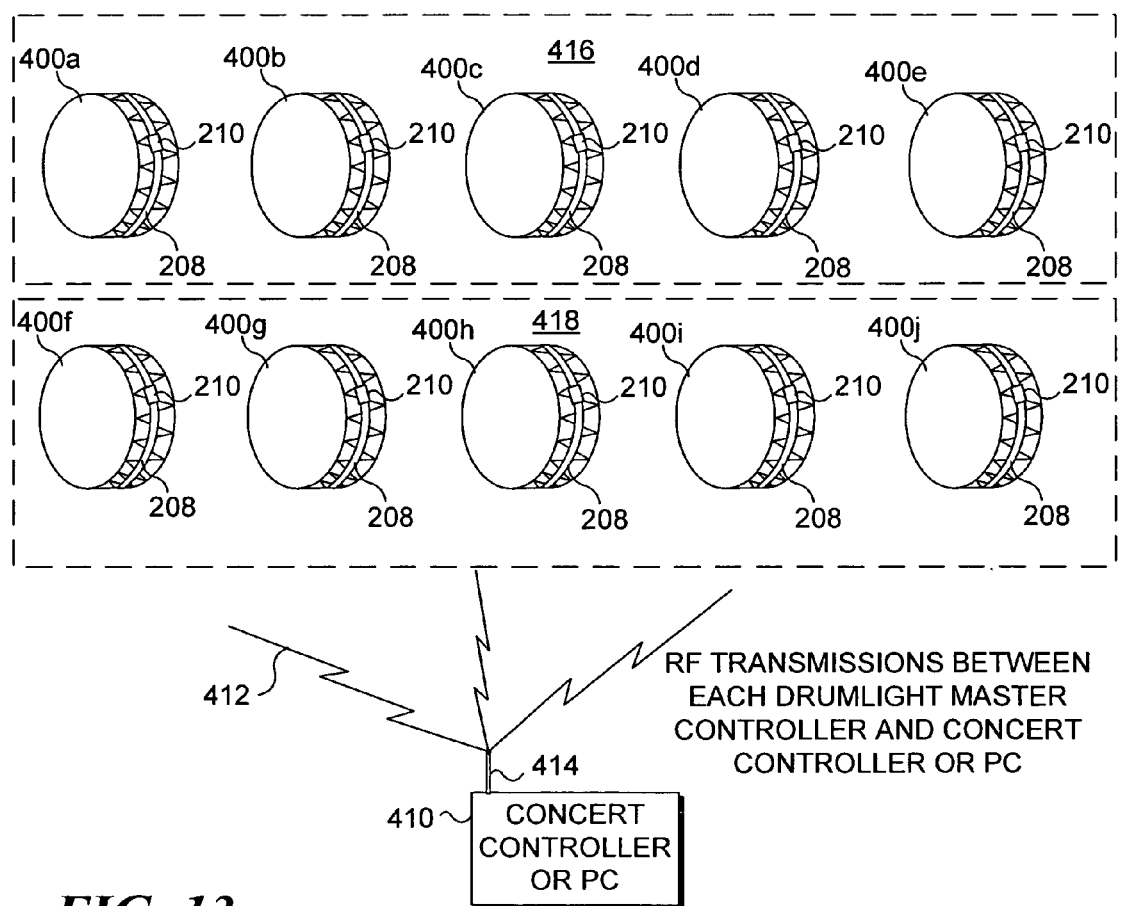
FIG. 13 is an exemplary schematic illustrating a plurality of drums, each fitted with a flexible band of "drumlights," and controlled by a master controller that is in wireless communication with a concert controller or PC.

The lighting control system can also be used in connection with a plurality of instruments that are controlled in response to patterns that are initiated in response to electronic vibration control signals or MIDI signals produced by another device, such as a concert controller or personal computer 410, as shown in FIG. 13. In this Figure, a plurality of drums 400a-400j are each provided with a flexible band 208 held onto the drum with a clasp 210 within which the master controller is disposed. Each master controller on each of these drums is in wireless communication with concert controller or PC 410. The concert controller or PC transmits and receives RF transmissions 412 to and from a wireless transmitter/receiver 506 (shown in FIG. 14) that is within clasp 210, via an antenna 414 on the concert controller or PC. The concert controller or PC can thus control the different colored LEDs within flexible band 208 on each of these drums so they are triggered in unison, or can send RF transmissions to specific drums in each of one or more groups, such as a group 416 (drums 400a-400e) and a group 418 (drums 400f-400j), of these drums so that the LEDs in the flexible bands coupled to the drums of a specific group are controlled with a specific pattern while the LEDs in the flexible bands coupled to the drums of a different group are controlled with a different specific pattern. Furthermore, one drum in each group, such as drum 400a in group 416 and drum 400f in group 418 can be selected to provide the electronic vibration signal used to control the LEDs in the flexible bands coupled to all of the other drums in that group, so that the beat of this controlling drum is used for energizing the LEDs according to a defined pattern transmitted by the concert controller or PC, or according to a predefined pattern stored in each master controller. Clearly, there are almost an infinite number ways in which the control of the LEDs coupled to each master controller on each drum 400a-400j can be configured to control the lights to produce desired lighting effects.

FIG. 14 illustrates how a generally conventional functional block diagram for a computing device 301 is coupled through communication I/O block 108 to master controller 22 and to the master controllers of instruments 508a-508n via wireless transmitter/receiver 506. The functional block diagram includes a display screen 500, a keyboard 502, and a touchpad 504, as is typical for such a computing device. The laptop computer can be coupled to communications I/O block 108 through either a USB, serial, parallel, IEEE 1394, or other appropriate data port link. Alternatively, functional block 301 can also be coupled with wireless transmitter/receiver 506 through a wireless link, for example through an internal wireless transmitter receiver that is included in the computing device and operates in conformance with one or more of the IEEE 802.11a, b, or g specifications. Similarly, the master controller for each of the instruments can be connected to communications I/O block 108 through an optional wired link 512, for example, conveying MIDI, DMX512, or another data format/protocol.

Associated with each instrument 508a-508n is a block 210 that includes a wireless communication module, a sensor, an array of light sources, and a master controller for that instrument. For wireless communications between wireless transmitter/receiver 506 and blocks 210, the digital data packets that are conveyed can be transmitted over an IEEE 802.11a, b, or g wireless link and optionally encrypted. The encryption of such transmissions can be important to prevent a third party's master controller from intercepting these transmission, or producing control signals that could adversely affect the master controller for one of the instruments 508a-508n that are being played. Furthermore, it is important that each data packet transmitted to a specific master controller or to a concert controller include the ID for that master controller or concert controller and be in encrypted form to ensure that no other master controller can intercept and respond to the transmission.

Master controller 22, which can alternatively be a concert controller that controls the master controllers on one or more groups of instruments and is shown in the upper right corner of FIG. 14, is also optionally connected to a plurality of color spotlights, lasers, or other light sources 510. Accordingly, in addition to the array of LEDs that are selectively energized on each instrument 508a-508n, these other light sources can also be made to flash in a desired pattern, producing different colored lighting effects in beat with one or more selected instruments.

Exemplary Software Interface for Creating Show Sequence

One of the advantages of coupling a computing device to a master controller arises in creating a drumlights show sequence where different patterns comprising light effects are stored and executed for different portions of the show. These patterns comprising the lighting effects are automatically applied in response to the electronic vibration signal produced by the sensor as an instrument is played. FIG. 15 illustrates an exemplary graphic user interface screen 600, which is illustrative of an example of the various control functions that can be employed for creating a drumlights show sequence, although a show sequence can readily be created for a different type of musical instrument with such an interface.

An exemplary show sequence 602 is illustrated and indicates the commands for initiating various patterns to produce available effects listed in a window 604. If a user clicks on one of the available effects listed in window 604, a description of the effect is displayed a window 606. Each effect that is placed into show sequence 602 may have its own attributes that are easily set by specifying parameters in an effect frame detail windows 608 and 610 of the interface. In effect frame detail windows 608, a user can selectively choose to wait for a trigger, causing the show to halt until a trigger has been received from a specific unit that is indicated by selections made in the group and device drop-down list boxes in this window. Conversely, if a delay start up time option is chosen, the show is halted until the time specified by the operator in the interface has elapsed. The current effect or previously recorded show sequence will then begin playing. It should also be understood that this exemplary user interface (or the concert controller) may change any parameter being used by the master controller(s) with which it is communicating as part of the show data being transmitted, so that the show can be dynamically changed while it is in progress.

If an entire group option is selected as a target, the specific effect will be applied to all units belonging to the selected group. Conversely, if this option is not selected, the effect will be sent to a unit specified by the group and device drop-down list boxes. Another option labeled "sequential" can be checked to set the effect beginning with the unit specified in the upper group and device drop-down list boxes, and ending with the unit identified in the lower group and device drop-down list boxes. This feature automatically replicates the effect (and all its attributes) n times, where n is entered by the operator, addressing each unit within the range independently.

In effect frame detail windows 610, an auto advance option can be selected to automatically advance the show playback line. After the effect is output to the one or more devices, the show will wait for the time designated by the operator for this parameter, before automatically playing the next effect in the list. If an "advance on trigger" option is selected, the show will single-step through the effects comprising the show each time a trigger is detected. For example, assuming that an effect comprises three or four other effects, each would be played back one at a time, each time that a trigger is detected. A trigger can come from any specified instrument being used to control a group of instruments. A repeat count parameter can be entered to indicate the number of times the same effect (and its attributes) should be cycled.

Concertmaster settings are selected by user in a window 612 to control the communication port and other parameters of a concert controller, such as the 14-bit ID of the concert controller host. In one embodiment, the protocol sets up units in a parent/child relationship. A parent is a concert controller host, and the children are the drumlights strips with their associated master controller and other peripherals. A parent may only speak to its children, and the children can only speak to their parent, so that multiple concert controllers can be employed for use with other groups of master controllers, if desired. One of the parameters is an encryption seven-bit value that is used to add a further level of security in communicating data between the concert controller host and its children units. If a wireless communication system is employed, the frequency can be specified by selecting one of 32 available frequency values for use during the communication. In this case, the text that is displayed would change from indicating "no wireless" to "wireless active."

Each unit can be selectively controlled to change the settings on the unit in real-time. For example, a row/column selector 614 enables a user to click a row, column, cell, or group of cells in order to change any function of the selected one or more units. Thus, with one click, an operator can change the current pattern to a desired pattern on a single unit or multiple units. In addition, an operator can send a trigger of some predefined velocity to one or more units, causing their lights to flash as if the instrument associated with the unit was being played. The first time that a new unit is seen in connection with the control provided by this interface, the specifics of that unit are queried, and the results are placed in a windows 616. A window 618 indicates the units for which parameters have been set or changed in the current session. A window 620 lists information that has been sent and received by the show creation interface software during the current session.

By clicking a save button 628, the entire show sequence list and its associated attributes will be parsed, saved to a database, and moved into a show playback window 622. At this point, the show is ready to be played simply by selecting and activating a "play show" control. A MIDI note-on event is caused to be sent out the MIDI port of the computing device each time a trigger is sent to one of the units. A "loop" option can be checked to cause the show to repeat continuously. Once the show has been saved, it can be loaded by pressing a load button 630, which brings up a dialog box enabling the operator to select a specific previously saved show sequence that is to be loaded for editing or playing.

It should be understood the many other approaches and interfaces can be used for setting up a sequence of effects to define the patterns of lights produced in response to signals supplied from the sensor during play of an instrument or in response to a MIDI input signal. Further, the master controller can be operated independently to control the array of light sources and is not required to be coupled either via a wired link or a wireless link to a computing device or concert controller host. Accordingly, the variations for using the master controller to selectively produce lighting effects with the array of light sources is virtually unlimited in this approach and this light system can be employed in many different applications that are not limited to responding to the beat of a drum.

Although the present invention has been described in connection with the preferred form of practicing it and modifications thereto, those of ordinary skill in the art will understand that many other modifications can be made to the present invention within the scope of the claims that follow. Accordingly, it is not intended that the scope of the invention in any way be limited by the above description, but instead be determined entirely by reference to the claims that follow.

The invention in which an exclusive right is claimed is defined by the following:

1. A lighting system that is responsive to vibrations produced by an instrument, comprising:
 (a) a vibration sensor adapted to be disposed on an instrument, producing an electronic vibration signal in response to vibrations that are directly sensed by the vibration sensor when the instrument is played;
 (b) a signal processor that is coupled to the vibration sensor to receive the electronic vibration signal and in response thereto, produces a plurality of drive signals in accord with predefined criteria, each of said plurality of drive signals being indicative of a velocity by being based on a rate of change of an amplitude of the electronic vibration signal over time; and
 (c) a plurality of light sources that are coupled to the signal processor and are energized in response to the plurality of drive signals, to produce light according to the predefined criteria.

2. The lighting system of claim 1, wherein the plurality of light sources comprise a plurality of lights of different colors, and where the predefined criteria determines which lights of a specific color are energized at a given time in response to the plurality of drive signals.

3. The lighting system of claim 1, wherein the plurality of light sources are disposed on an elongate flexible band that is adapted to be attached to the instrument, so that light emitted by the plurality of light sources is visually associated with an instrument producing vibrations that are used in controlling the plurality of light sources.

4. The lighting system of claim 1, wherein the predefined criteria define at least one of:
   (a) an intensity of each light source that is energized;
   (b) a duration for energizing each light source;
   (c) a spatially visual pattern produced by the plurality of light sources when energized; and
   (d) a sequence for energizing the plurality of light sources.

5. The lighting system of claim 1, wherein the plurality of light sources is mounted on a substrate in at least one array.

6. The lighting system of claim 5, wherein the substrate is flexible, further comprising a flexible and transparent cover through which light emitted by the plurality of light sources is visible.

7. The lighting system of claim 1, wherein the instrument is a drum and the vibration sensor is adapted to be mounted to sense vibrations of the drum.

8. The lighting system of claim 1, further comprising a communication link to a controller in which the signal processor is disposed, said communication link comprising one of:
   (a) a wired link; and
   (b) a wireless link.

9. The lighting system of claim 8, wherein the wireless link communicates a digital data signal corresponding to the electronic vibration signal, in an encrypted format, the digital data signal having an identifier that is associated with the vibration sensor, and thus, with an instrument on which the vibration sensor is disposed.

10. The lighting system of claim 8, farther comprising:
   (a) at least one additional set of a plurality of light sources; and
   (b) at least one additional vibration sensor that produces an electronic vibration signal in response to vibrations of at least one additional instrument when played, wherein the controller is coupled to receive electronic vibration signals from at least one vibration sensor over the communication link and to produce a plurality of drive signals to drive each of a plurality of different light sources in accord with the predefined criteria and in response to the plurality of drive signals produced by at least one vibration sensor.

11. The lighting system of claim 1, farther comprising a data link that is adapted to couple to a computing device on which a set of machine instructions are executed to provide a user interface for selecting parameters for the predefined criteria.

12. A method for controlling a plurality of light sources in response to vibrations of an instrument, comprising the steps of:
   (a) sensing vibration of a portion of the instrument while the instrument is being played, producing an electronic vibration signal in response thereto;
   (b) sampling the electronic vibration signal in order to produce a velocity-based signal indicative of a rate of change of an amplitude of the electronic vibration signal over time; and
   (c) controlling the plurality of light sources in response to the velocity-based signal so that the plurality of light sources produce light in accord with a predefined criteria.

13. The method of claim 12, further comprising the step of enabling a user to select parameters for the predefined criteria in a user interface on a computing device.

14. The method of claim 12, further comprising the step of enabling a user to removably attach the plurality of light sources to the instrument.

15. The method of claim 12, further comprising the step of communicating the electronic vibration signal to a controller that executes the predefined criteria over one of:
   (a) a wired communication link; and
   (b) a wireless communication link.

16. The method of claim 15, further comprising the steps of:
   (a) converting the electronic vibration signal to digital data; and
   (b) transmitting the digital data over one of:
      (i) the wired communication link; and
      (ii) the wireless communication link using a radio frequency data signal.

17. The method of claim 12, wherein the plurality of light sources comprise a plurality of lights of different colors, and where the predefined criteria determine which lights of a specific color are energized at a given time in response to the velocity-based signal.

18. The method of claim 12, wherein the predefined criteria define at least one of:
   (a) an intensity of each light source that is energized;
   (b) a duration for energizing each light source;
   (c) a spatially visual pattern produced by the plurality of light sources when energized; and
   (d) a sequence for energizing the plurality of light sources.

19. The method of claim 12, further comprising the step of enabling the user to mount a vibration sensor on the instrument in a position at which the vibration sensor senses the vibration of the instrument as the instrument is played.

20. The method of claim 12, wherein the plurality of light sources are disposed on an elongate band that is adapted to be wrapped around the instrument and secured thereto.

21. The method of claim 12, farther comprising the step of optionally responding to a data input when controlling the plurality of light sources.

22. The method of claim 12, further comprising the step of controlling a plurality of sets of light sources in response to electronic vibration signals from one of:
   (a) a single one of a plurality of instruments, in accord with the predefined criteria; and
   (b) each of the plurality of instruments, in accord with the predefined criteria.

23. The method of claim 12, wherein at least some of the plurality of light sources are disposed remote from the instrument.

24. The method of claim 12, further comprising the step of storing data derived from the electronic vibration signal to evaluate a performance of the user in playing the instrument, by comparing the data stored to a predefined standard.

25. The method of claim 24, further comprising the step of determining a difference in timing between the predefined standard relative to one of:
   (a) the data that have been stored by a user when previously playing the instrument; and
   (b) the data as provided in substantially real time while the user is playing the instrument.

26. The method of claim 12, further comprising the step of providing a visual cue to the user regarding a performance of the user in playing the instrument, using the plurality of light sources, to enable the user to improve in playing the instrument.

27. The method of claim 26, wherein the instrument comprises a percussion instrument, and wherein the performance of the user is evaluated against a timing indicated by a musical score to determine a relative timing error of the user in achieving a beat defined by the musical score.

28. A percussion lighting display system for use with a percussion instrument, comprising:
   (a) a vibration sensor adapted to be applied to the percussion instrument to sense vibration produced when the percussion instrument is played, producing an output signal;
   (b) a plurality of different color light sources; and
   (c) a controller coupled in communication with the different color light sources, and with the vibration sensor to receive the output signal produced thereby, the controller producing a plurality of drive signals that independently drive selected light sources of different colors from among the plurality of different color light sources, as a function of the output signal and as a function of a velocity determined by a rate of change of an amplitude of the output signal over time and as defined by user-selectable parameters.

29. The percussion lighting display system of claim 28, wherein the plurality of different color light sources are disposed in an array on an elongate flexible band that is adapted to be attached to the percussion instrument so that light from the different color light sources is visible while the percussion instrument is being played.

30. The percussion lighting display system of claim 28, wherein at least some of the plurality of different color light sources are disposed remote from the percussion instrument.

31. The percussion lighting display system of claim 29, further comprising a communication port on the controller adapted for coupling to a computing device to enable a user to selectively input the user-selectable parameters that define how the light sources of different color are driven to emit light.

32. The percussion lighting display system of claim 28, wherein the controller is adapted to be coupled to a plurality of vibration sensors associated with other percussion instruments and to control plural sets of lights of different color in response to output signals received from at least one of the plurality of vibrations sensors, as defined by the user-selectable parameters.

33. A lighting system that is responsive to vibrations produced by an instrument, comprising:
   (a) a vibration sensor adapted to be disposed on an instrument, producing an electronic vibration signal in response to vibrations that are directly sensed by the vibration sensor when the instrument is played;
   (b) a signal processor that is coupled to the vibration sensor to receive the electronic vibration signal and in response thereto, producing a plurality of drive signals in accord with predefined criteria; and
   (c) a plurality of light sources that are coupled to the signal processor and are energized in response to the plurality of drive signals, to produce light according to the predefined criteria, said plurality of light sources being disposed on an elongate flexible band that is adapted to be attached to the instrument, so that light emitted by the plurality of light sources is visually associated with an instrument producing vibrations that are used in controlling the plurality of light sources.

34. A method for controlling a plurality of light sources in response to vibrations of an instrument, comprising the steps of:
   (a) sensing vibration of a portion of the instrument while the instrument is being played, producing an electronic vibration signal in response thereto;
   (b) converting the electronic vibration signal to digital data and transmitting the digital data to a controller over either a wire communication link or a wireless communication link using a radio frequency data signal; and
   (c) controlling the plurality of light sources in response to the digital data so that the plurality of light sources produce light in accord with a predefined criteria over either the wired communication link or the wireless communication link.

* * * * *